United States Patent
Hillman et al.

(10) Patent No.: US 7,467,326 B2
(45) Date of Patent: Dec. 16, 2008

(54) SELF-CORRECTING COMPUTER

(75) Inventors: Robert Allen Hillman, San Diego, CA (US); Mark Steven Conrad, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 852 days.

(21) Appl. No.: 10/418,713

(22) Filed: Apr. 17, 2003

(65) Prior Publication Data

US 2004/0199813 A1 Oct. 7, 2004

Related U.S. Application Data

(60) Provisional application No. 60/451,041, filed on Feb. 28, 2003.

(51) Int. Cl.
*G06F 11/00* (2006.01)
(52) U.S. Cl. ............... 714/11; 714/12; 714/13
(58) Field of Classification Search ............... 714/13, 714/12, 11
See application file for complete search history.

(56) References Cited

U.S. PATENT DOCUMENTS

| | | | | |
|---|---|---|---|---|
| 4,967,347 A | * | 10/1990 | Smith et al. | ............ 714/12 |
| 5,146,589 A | | 9/1992 | Peet, Jr. et al. | |
| 5,193,175 A | | 3/1993 | Cutts, Jr. et al. | |
| 5,222,229 A | * | 6/1993 | Fukuda et al. | ............ 713/375 |
| 5,295,258 A | * | 3/1994 | Jewett et al. | ............ 714/12 |
| 5,317,726 A | | 5/1994 | Horst | |
| 5,339,404 A | | 8/1994 | Vandling, III | |
| 5,361,369 A | * | 11/1994 | Kametani | ............ 718/106 |
| 5,384,906 A | * | 1/1995 | Horst | ............ 713/375 |
| 5,452,441 A | * | 9/1995 | Esposito et al. | ............ 714/13 |
| 5,473,770 A | | 12/1995 | Vrba | |
| 5,537,655 A | | 7/1996 | Truong | |
| 5,572,620 A | | 11/1996 | Reilly et al. | |
| 5,588,111 A | | 12/1996 | Cutts, Jr. et al. | |
| 5,600,784 A | | 2/1997 | Bissett et al. | |
| 5,615,403 A | | 3/1997 | Bissett et al. | |
| 5,635,754 A | * | 6/1997 | Strobel et al. | ............ 257/659 |

(Continued)

OTHER PUBLICATIONS http://foldoc.doc.ic.ac.uk/foldoc/foldoc.cgi?ECC☐☐.*

(Continued)

*Primary Examiner*—Yolanda L Wilson
(74) *Attorney, Agent, or Firm*—Hensley Kim & Holzer, LLC

(57) ABSTRACT

The fault-tolerant or self-correcting computer system is disclosed. The computer system that is provided with various sets of protections against failures that may be caused by space radiation, for example. Improved reliability of the system is achieved by scrubbing of the components on a regular schedule, rather than waiting for an error to be detected. Thus, errors that may go undetected for an extended period are not allowed to propagate and further damage the system. Three or more processors are provided to operate in parallel, and a controller is provided to receive signals from the processors and, using a voting logic, determines a majority signal value. In this manner, the controller can detect an error when a signal from one of the processors differs from the majority signal. The system is also provided with a scrubbing module for resynchronizing the processors after a predetermined milestone has been reached. The milestone may be a predetermined time interval or any other event that may be defined by a user.

13 Claims, 8 Drawing Sheets

U.S. PATENT DOCUMENTS

| | | | |
|---|---|---|---|
| 5,742,753 A * | 4/1998 | Nordsieck et al. | 714/11 |
| 5,754,563 A | 5/1998 | White | |
| 5,758,113 A | 5/1998 | Peet, Jr. et al. | |
| 5,812,757 A * | 9/1998 | Okamoto et al. | 714/11 |
| 5,845,060 A * | 12/1998 | Vrba et al. | 714/12 |
| 5,896,523 A | 4/1999 | Bissett et al. | |
| 5,903,717 A | 5/1999 | Wardrop | |
| 5,956,474 A | 9/1999 | Bissett et al. | |
| 6,038,685 A | 3/2000 | Bissett et al. | |
| 6,073,251 A | 6/2000 | Jewett et al. | |
| 6,104,211 A | 8/2000 | Alfke | |
| 6,141,769 A * | 10/2000 | Petivan et al. | 714/10 |
| 6,240,526 B1 * | 5/2001 | Petivan et al. | 714/11 |
| 6,263,452 B1 | 7/2001 | Jewett et al. | |
| 7,036,059 B1 * | 4/2006 | Carmichael et al. | 714/725 |
| 2003/0061535 A1 | 3/2003 | Bickel | |

OTHER PUBLICATIONS http://whatis.techtarget.com/wsearchResults/1,290214,sid9,00.html?query=asic or http://searchsmb.techtarget.com/sDefinition/0,290660,sid44_gci213785,00.html.* http://whatis.techtarget.com/wsearchResults/1,290214,sid9,00.html?query=fpga or http://searchsmb.techtarget.com/sDefinition/0,290660,sid44_gci530571,00.html.*

Cache—http://en.wikipedia.org/wiki/Cache_%28computing%29.*

Iacoponi, M.J., Institute of Electrical and Electronics Engineers: "Optimal Control of Latent Fault Accumulation," IEEE XP010016727, vol. 19, Jun. 21, 1989; (7 pages).

European Patent Office, Supplementary European Search Report (EPO form 1503) for European Patent Application No. EP 04809302.5; Jan. 24, 2008; (4 pages).

* cited by examiner

SELF-CORRECTING COMPUTER

This application is related to U.S. Provisional Patent Application No. 60/451,041, filed Feb. 28, 2003, from which priority is claimed, and which is hereby incorporated by reference in its entirety, including all tables, figures, and claims.

FIELD OF THE INVENTION

The present invention relates generally to computer systems. More particularly, the invention relates to fault-tolerant or self-correcting, integrated computer systems.

BACKGROUND

The following description is provided to assist the understanding of the reader. None of the information provided or references cited is admitted to be prior art to the present invention.

Certain environments require that computer systems in use be extremely reliable. At the same time, some of these environments may be extremely harsh, exposing computer components to potentially catastrophic elements.

One such environment is the space environment. Computer systems that may be placed in space, such as in Earth orbit, are not available for regular maintenance and must, therefore, be guaranteed to perform for the life of the spacecraft. Thus, a computer system mounted on a spacecraft must be highly reliable and be robust in its tolerance to faults, either internal or external.

Further, objects in the space environment are subject to various types of radiation that may be extremely harmful to certain computer components. For example, a single radiation element may cause an upset, referred to as a single-event upset (SEU), of either a processor or a memory in a computer system. A computer in the space environment should desirably be tolerant to such single-event upsets.

Developing computer components that are individually tolerant to such upsets can be extremely expensive and inefficient. Foremost, due to the long development cycles, such components generally lack the performance of the state-of-the-art components. For example, a processor designed to be radiation tolerant may be two years old by the time the development is complete. In those two years, the state of the art in processors may have more than doubled the performance of processors. Further, hardening such components against faults may make the components poor in cost-effectiveness.

U.S. Pat. No. 5,903,717 discloses a computer system for detecting and correcting errors from SEUs. The system includes a plurality of processors (CPUs) whose outputs are voted at each clock cycle. Any CPU output signal which does not agree with a majority of the CPU output signals results in an error signal being produced. The system reacts to the error signals by generating a system management interrupt. In reaction to the system management interrupt resulting from a detected error, software initiates re-synchronization of the plurality of CPUs when the error is caused by a single-event upset.

SUMMARY OF THE INVENTION

The invention described herein relates to computer systems that are robust in their tolerance to single-event effects that may be encountered, for example, in the space environment or by high-altitude aircraft. The invention relates to a computer system that is provided with various sets of protections against failures that may be caused by space radiation, for example. Such protections include one or more of the following: multiple processors, multiple memory modules, error detection and correction logic, and mechanical shielding of the components. The invention improves the reliability of a system by providing scrubbing of the components on a regular schedule, rather than waiting for an error to be detected. Thus, errors that may go undetected for an extended period are not allowed to propagate and further damage the system.

In one aspect, the invention provides a fault-tolerant computer system with three or more processors. A controller is provided to receive signals from the processors and, using voting logic, determines a majority signal value. The controller can detect an error when a signal from one of the processors differs from the majority signal. The system is also provided with a scrubbing module for resynchronizing the processors after a predetermined milestone has been reached. The milestone may be a predetermined time interval or any other event that may be defined by a user. The majority signal value may be used for the resynchronizing of the processors.

In a preferred embodiment, the controller suspends operation of a processor which yields a signal differing from the majority signal. Thus, the system continues operation with the remaining processors. The controller can change the predetermined milestone, such as a time interval, based on the frequency of recorded errors. For example, if errors are recorded more frequently than expected, the time interval between scrubs may be shortened.

The scrubbing module can resynchronize the processors by flushing selected processor state elements for each processor into a main memory. This stores the data in the processor memory so it can be used to resynchronize the processors. The scrubbing module can provide each processor with restoration data. The restoration data corresponds to majority data for selected state elements of the processor states. In other words, data in each state element, such as registers, of the processor states for all processors is used to determine a majority value. A majority value is determined for each selected state element. The majority values for all state elements then correspond to the restoration data used to resynchronize the processors.

The controller may include field-programmable gate arrays (FPGAs) for the voting logic. FPGAs are logic devices that can be programmed. Typical FPGAs include a large array of gates. The FPGAs in the controller may be individually fault-tolerant and, therefore, can tolerate faults such as single-event upsets as individual units. Alternatively, the controller may employ application-specific integrated circuits (ASICs).

Each processor may be provided with a radiation-mitigating shield, which is a mechanical shield adapted to shield a component or a set of components from a radiation-affected environment. Alternatively, the computer system may be provided with a radiation-mitigating shield for protecting substantially all components of the computer system.

The computer system may also be provided with a memory module in communication with the processors. The communication between the memory module and the processors can be directed through the controller. The memory module can include three or more mirrored memory elements, such as a synchronous dynamic random access memory (SDRAM) and electrically erasable programmable read-only memory (EEPROM), and a memory scrub module. The memory scrub module is adapted to detect and correct an error in one or more of the memory elements when an entry at a selected address of the one or more memory elements differs from an entry at the selected address of a majority of the memory elements.

A memory module may be a memory element or a set of elements such as an SDRAM and an EEPROM. A memory module is generally provided to store data for analysis or use by, for example, one or more processors and may include memory access and control logic, including error correction logic.

The memory scrub module can reconfigure memory elements in which an error is detected. The error may be detected by comparison of the entries at a specified address in each memory element. An entry at an address of a memory element is typically a binary number between 0 and 255 for computers and memory elements in which a byte is equal to eight bits. Generally, each value of a byte corresponds to a character.

If the comparison yields a disagreement among the entries, then an error is detected in the memory element having an entry differing from the majority entry. The memory scrub module then reconfigures the error-containing element with the entry at the specified address being changed to the majority entry. Thus, the reconfigured memory elements contain an entry at the selected address identical to the entry at the selected address of the majority of the memory elements before the reconfiguration.

The memory scrub module may test for errors at each read or write to a specified address. Further, the memory scrub module can test for errors at regular intervals and to reconfigure the memories to correct the error.

The memory module can include error detection and correction logic. One form of error detection and correction logic includes Reed-Solomon error correction. Reed-Solomon is a well-known algorithm for efficiently detecting and correcting multiple errors in memory devices. For one implementation of Reed-Solomon, reference may be made to U.S. Pat. No. 5,754,563, titled "Byte-Parallel System for Implementing Reed-Solomon Error-Correcting Codes," which is hereby incorporated by reference in its entirety.

In another aspect, the invention provides a fault-tolerant computer system with three or more mirrored memory elements and a memory scrub module. The memory scrub module can detect an error in the memory elements when an entry at a selected address of a memory element differs from an entry at the same address of a majority of the memory elements. The memory scrub module can test for errors at regular predetermined intervals.

The memory scrub module can reconfigure the memory elements to contain an entry at the selected address identical to the entry at the selected address of the majority of the memory elements prior to the reconfiguration. The memory scrub module can test for errors at each read or write to the selected address.

The memory scrub module can include an array of AND gates. An AND gate is a logic device that receives two inputs and yields an output. Generally, each input and the output have values of either "0" or "1". If both inputs have a value of "1", the output will have a value of "1". Otherwise, the output will have a value of "0". Each gate in the array has as two inputs, each input being a signal from a different memory element. The memory module can also include an OR gate having as inputs the output from each gate in the array of AND gates. An OR gate is a logic device that receives two or more inputs and yields an output. Again each input and the output have values of either "0" or "1". The output has a value of "1" when any input has a value of "1". The memory scrub module can output the majority value from a memory address of the various memory elements.

Thus, the disclosed embodiments of the present invention provide computers and computers systems with tolerance to single-event effects of various components. The present invention can accomplish this without hardening of the components themselves, which can be extremely expensive and time-consuming. The invention provides a significant increase in system reliability by providing scrubbing of the processors without waiting for an error to be detected. Further, the invention allows use of commonly available components, such as commercial processors and memory elements. This allows use of state-of-the-art components, thereby providing a substantial improvement in performance of a system.

While aspects and embodiments of the present invention are described herein, it would be understood that such descriptions are exemplary of uses and aspects of the presently described fault tolerant or self correcting computer system and should not be limiting in content.

DETAILED DESCRIPTION

Figure 1:
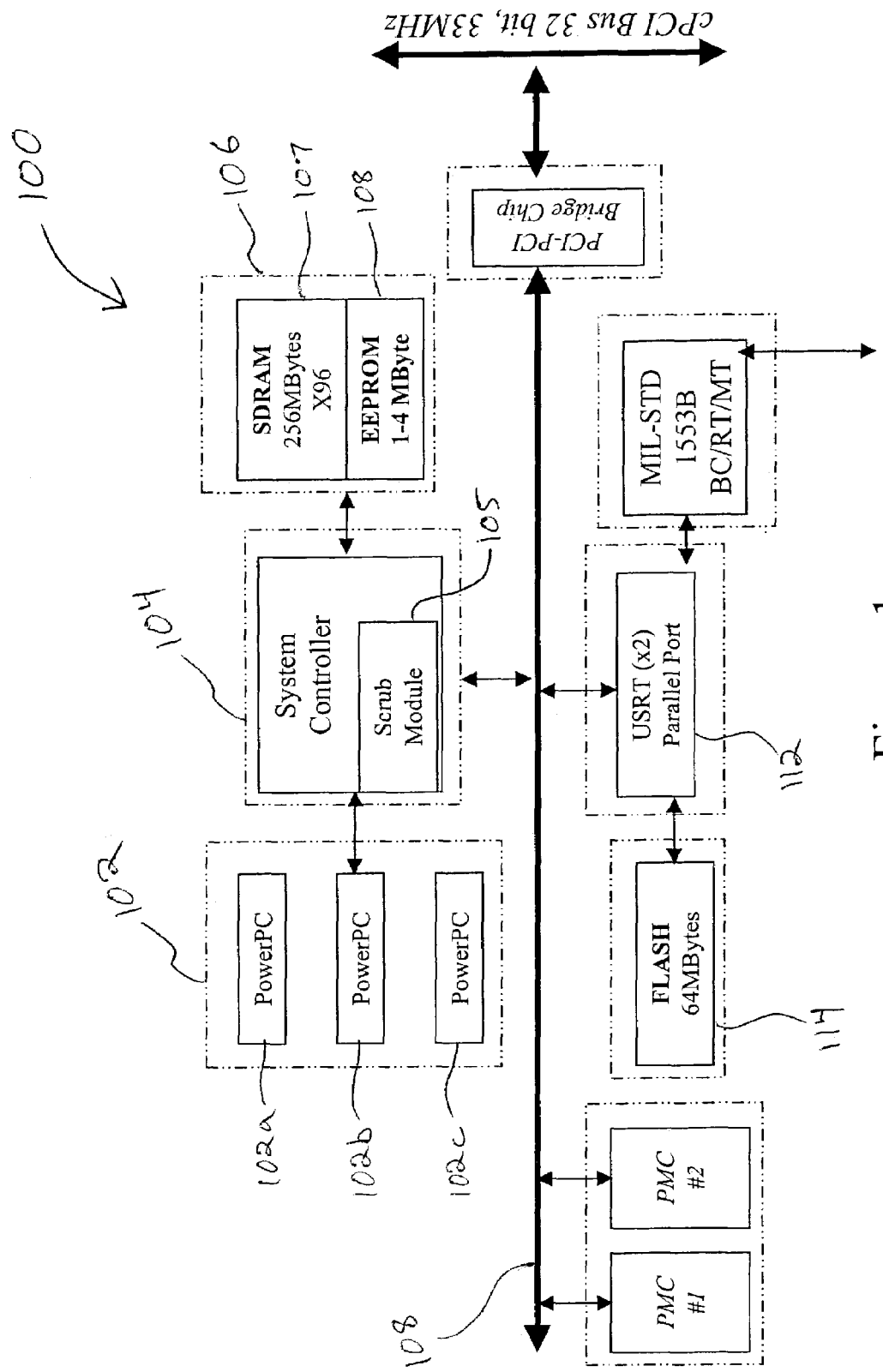
FIG. 1 is functional block diagram of an embodiment of a fault-tolerant computer system according to an embodiment of the invention.

The present invention is generally directed to a computer system and computer components that are tolerant to one or more single-event effects. In this regard, any combination of several types of protection may be provided to improve reliability of the component or the system.

The disclosed computer systems are provided with improved robustness in their tolerance to errors such as single-event effects that may be encountered, for example, in the space environment or by high-altitude aircraft. While prior systems have employed systems with redundant components that can be resynchronized, these prior systems generally wait until an error is detected to initiate resynchronization. If the detection of an error is used as a criteria for resynchronization, errors that may not be detected for an extended period of time may be allowed to corrupt other segments of the component. For example, a single-event effect may cause an error in a memory bit of one processor. If that bit is only accessed once per day, for example, no resynchronization will be initiated for up to twenty-four hours. Within that period, the same bit in another processor may also be affected by a single-event effect, thus causing a majority of the processors to be faulty in a three-processor arrangement. The present invention eliminates this problem by providing scheduled scrubbing of at least a portion of the computer components. The scrubbing can correct an error even if it would not be detected otherwise.

Definitions

A "computer system," as used herein, refers to an arrangement of one or more components forming at least a part of a computer. The arrangement may include an integrated set of components such as processors, memory and busses.

The phrase "single-event effect" refers to a fault in a computer component, such as a processor or a memory, caused by a single, isolated event. For example, a radiation particle may cause a single-event effect by striking a single bit in a memory module, causing a "1" to be changed to a "0". It is noted that, although the description of the embodiments refer to single-event effect tolerance, those skilled in the art will recognize that variations of the embodiments may include multiple-event upset tolerances. These variation are contemplated and are within the scope of the invention.

"Space radiation" refers to radiation found in a normal space environment. This type of radiation may be commonly encountered by a spacecraft in Earth orbit and may arise from existing radiation belts or from extra-planetary sources. For example, harmful, high-energy particles are present in the Van Allen radiation belts. Certain radiation may also be encountered by aircraft in a high-altitude environment.

"Earth orbit," as used herein, refers to a path that may be followed by an object, such as a spacecraft, around the Earth. Such orbits are typically elliptical in shape, but may also be parabolic or hyperbolic.

A "spacecraft" may be any man-made object intended for use in space. The spacecraft may be an object intended for either long-term space deployment, as is the case with most satellites, or short-term use, such as most manned-vehicles. Spacecraft may be intended for space use either in Earth orbit or interplanetary trajectories. Earth-orbit crafts include most communication or weather satellites, for example.

"Error detection and correction logic" refers to algorithms for detecting and correcting an error in, for example, a memory module. Such algorithms may be implemented as software, hardware or firmware.

"Mechanical shielding," as used herein, refers to a physical structure intended to shield a component, such as a processor or a memory module, from a potentially harmful environment. One example of shielding is described in U.S. Pat. No. 5,635,754, which is hereby incorporated by reference in its entirety.

The term "fault-tolerant" refers to the ability of a system or a component to tolerate errors. Fault tolerance can be useful in mitigating a potentially catastrophic event.

A "processor" may be any computer processor, such as a microprocessor. Such microprocessors are generally formed on silicon chips and often form or include the central processing unit (CPU) of a computer or computer system.

A "controller" is generally a component which controls the flow of data in a computer. A controller may, for example, control the delivery of data from a processor to other components through a bus. Further, controllers may incorporate logic that dictates the flow of data.

The term "majority," as used herein, refers to a group accounting for more than half of the total group population. For example, in a system having three voters, either two or three would constitute a majority, while one would not.

The term "module" is used herein to refer to either a hardware component, a software program, function, routine, subroutine or the like, a portion thereof, or a combination thereof. In a hardware component, a module may be a portion of a larger component. Conversely, a module may also include more than one component.

As used herein, the term "resynchronize" means to reconfigure the state of a component, such as a processor, to a prior state. In the present invention, the state after resynchronization of the processors may be determined by the controller based on inputs from the plurality of processors prior to the resynchronization.

As used herein, the term "reset" refers to the reconfiguring of the state of a component to a predetermined state. The resetting may reconfigure the component to a start-up state.

A "predetermined interval" refers to a time period, a cycle frequency or another measure that may be set by a user, a processor or a controller. In the case of a time period, the predetermined interval may be, for example, one second, one minute, one hour, etc. This interval may be selected to ensure a low probability of multiple-event failures. For example, if a single-event effect is expected once every twenty-four hours, the interval for resynchronizing the processors may be set at one second. In this manner, the probability of two failures occurring within one resynchronization cycle (one second) is extremely low.

The term "suspend" is used herein to refer to the taking offline of a component such as a processor. In implementation, a processor may be suspended by holding it in reset. Essentially, this removes the processor from operation within the computer system. Additionally, the processor may be isolated to prevent resource contention with the operating processors.

The "frequency of recorded errors" refers to the rate at which the controller detects and records an error. For example, as described above, if the expected single-event effect rate is once every twenty-four hours, the actual frequency of recorded errors may be once every twelve hours. Thus, to maintain the same probability of a multiple-event failure, the interval for resynchronization may be changed from one second to one-half second.

The "processor state" is defined by the values in a set of state elements, such as registers, provided within the processor. The processor state may also be determined by the values in a cache, either within or outside the processor. The processor state may also be defined by internal processor elements that can only be accessed, and hence set, indirectly.

The "main memory" is a memory element or a memory module containing one or more memory elements. The main memory is typically in communication with the processors through the controller. In the disclosed embodiment, the main memory includes synchronous dynamic random access memory (SDRAM) and electrically erasable programmable read-only memory (EEPROM).

The phrase "restoration data" is used herein to refer to the data corresponding to the majority data in selected state elements of the processor state of all processors. Data in each selected state element for all processors is used to determine a majority value. A majority value is determined at each selected state element. The majority values for all selected state elements then correspond to the restoration data used to resynchronize the processors.

A "memory scrub module" may be either a software, hardware, or firmware component adapted to facilitate maintenance of the memory elements.

As used herein, the term "address" refers to a location on the memory element. A unique address typically corresponds to a single byte in the memory element.

A computer system according to the present invention incorporates a processor module having a plurality of processors. The processor module includes at least three processors, but may include a larger number for further improving the reliability of the system. Each processor operates independently of and in parallel with the other processors. The outputs from the processors are provided to a voting logic, which can determine if one or more of the processors is yielding an output that is different from a majority of the processors to detect an error. Upon detection, the error is logged, and the operation of the error-containing processor is suspended.

The voting logic may be contained in a controller, which may also contain other functions and modules. In particular, the controller may contain a scrubbing module for providing scrubbing and resynchronization of the processors on a scheduled basis. Alternatively, the scrubbing module may reside or execute, either in part or in entirety, within each processor. As part of the scrubbing, the scrubbing module flushes the processor memories to a main system memory and restores the processor memories with restoration data generated from a comparison of the processor memories.

System Architecture

FIG. 1 illustrates one embodiment of a computer system for providing the fault-tolerance through scheduled scrubbing. The illustrated system 100 includes a processor module 102 in communication with a system controller 104. The processor module 102 includes three separate and independent processors 102a-c operating in parallel. The processors 102a-c may be any of a number of types of processors. Preferably, commercially available, state-of-the-art processors are provided. More preferably, PowerPC™ processors are used to achieve improved performance. Each processor 102a-c has a corresponding set of processor state elements, such as registers. The processor state elements may be either internally integrated with the respective processor 102a-c, or may be externally located.

The use of state-of-the-art processors allows the computer system 100 to achieve excellent performance. Of course, the state-of-the-art processors depend greatly on the timing of the selection of the processors. Historically, processor speeds have doubled every 18 months. Thus, the ability to use state-of-the-art processors for certain applications may provide a tremendous advantage. For example, for many space applications, a computer system may be assembled at the time of mission planning, but the mission may not actually begin until years later. The processors may be selected closer to the launch date to provide a higher-performing computer system.

The system controller 104 performs several functions. Primarily, controllers are provided in computer systems to direct the flow of data. For example, SCSI or PCI controllers control the flow of data to certain peripherals. In the embodiment illustrated in FIG. 1, the controller 104 provides control of data flow between the processor module 102, a memory module 106 and a primary bus 108. The system controller 104 of the embodiment illustrated in FIG. 1 also includes a scrubbing module 105 for detecting and correcting errors that may occur in the processors, as described below with reference to FIGS. 2 and 3. The scrubbing module 105 may alternatively reside or operate, either in part or in entirety, within each processor 102a-c.

The memory module 106 is the primary system memory for the computer system 100. It may contain permanently stored information including instructions for the processor module 102. Further, it may store data used and/or updated by the processor module 102. In one embodiment, the memory module 106 includes 256 megabytes of SDRAM 107 and 4 megabytes of EEPROM 109. As described below with reference to FIG. 5, one embodiment of the memory module 106 includes three or more mirrored memory elements.

The bus 108 may be a standard bus used in common computers. In the illustrated embodiment, the bus 108 is in communication with a variety of components. In addition to the system controller 104, the bus 108 provides communication with a parallel port 112 and a flash memory 114.

Fault-Tolerant Processor Module

Figure 2:
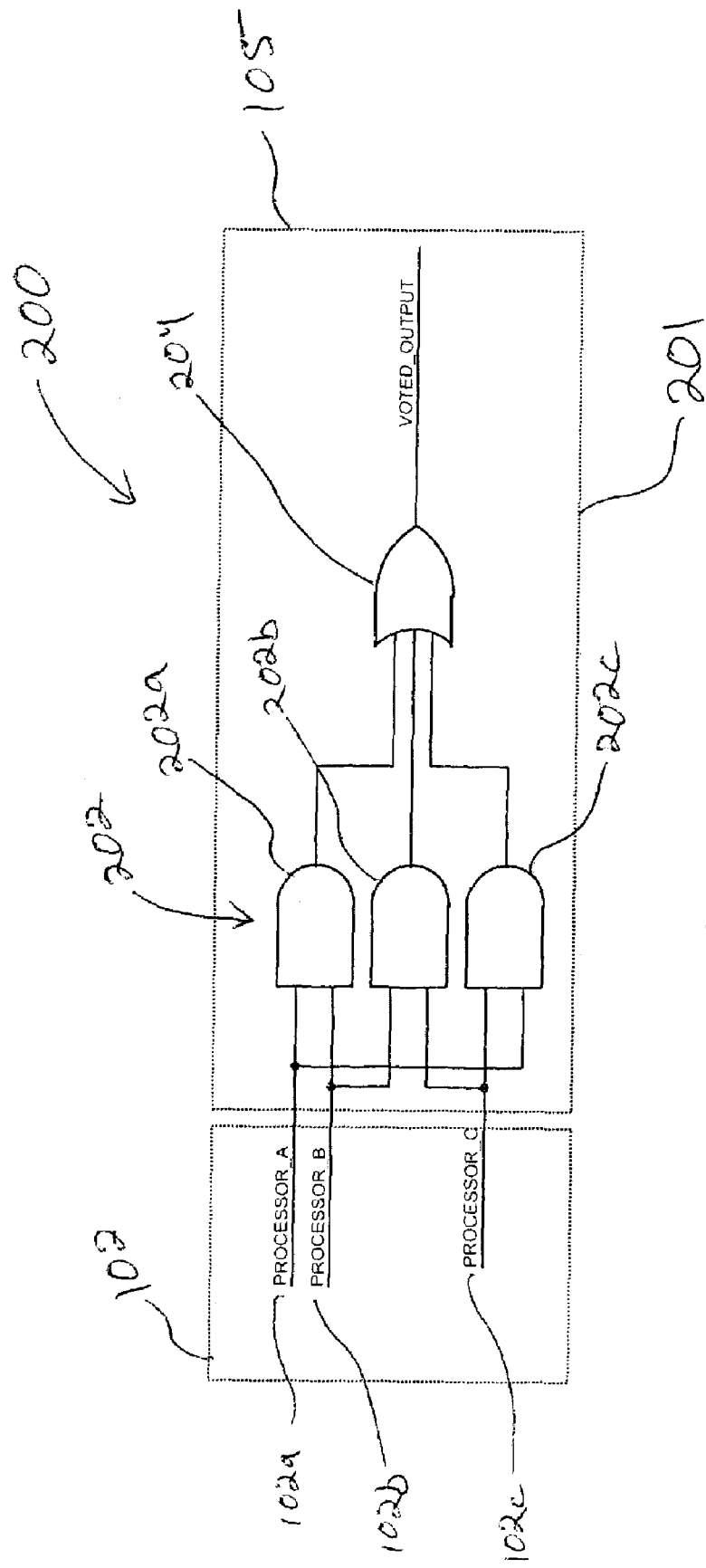
FIG. 2 is a schematic illustration of an arrangement to provide tolerance to faults in a processor.

FIG. 2 illustrates one arrangement 200 for providing fault tolerance in the processor module 102. As noted above, the processor module 102 includes a plurality of processors 102a-c. Although the embodiment of FIGS. 1 and 2 illustrates three processors, additional fault tolerance may be achieved by providing additional processors. In this regard, a processor module 102 with three processors provides single-event effect protection. Each additional processor would provide protection against another upset event. For example, a five-processor module may provide protection against up to three single-event effects.

The processors 102a-c operate in parallel. In certain embodiments, the processors 102a-c operate in complete synchronization. This may be achieved by causing the processors 102a-c to operate substantially in lock step by transmitting synchronous signals to the processors, for example.

In the illustrated embodiment, the controller 104 includes a voting logic 201 that may be implemented as a set of gates to determine a majority signal value of the processors 102a-c. The voting logic 201 is adapted to operate on every valid and relevant signal received from each processor 102a-c. In this regard, the voting logic 201 is able to detect errors in any address, data or control signal from the processors 102a-c.

An array of AND gates 202 is provided to receive inputs from the processors 102a-c at each clock cycle. Each AND gate 202a-c has a first input from one processor and a second input from a different processor. Together, the AND gates in the gate array 202 include inputs from each possible pair of processors in the processor module 102. Thus, the number of AND gates required in the gate array 202 is dependant on the number of processors. For example, for a three-processor module, the gate array 202 includes three AND gates, while a processor module with five processors will require ten AND gates.

The output from each AND gate 202a-c in the gate array 202 is directed to an OR gate 204. The number of inputs for the OR gate depends on the number of AND gates in the gate array 202, which in turn, as noted above, is dependant on the number of processors in the processor module 102. It will be understood by those skilled in the art that the arrays of gates may be field-programmable gate arrays (FPGAs), as well as other majority voting logic systems and methods. The output of the OR gate 204 provides the majority value of the signals from the processors 102a-c.

Figure 7:
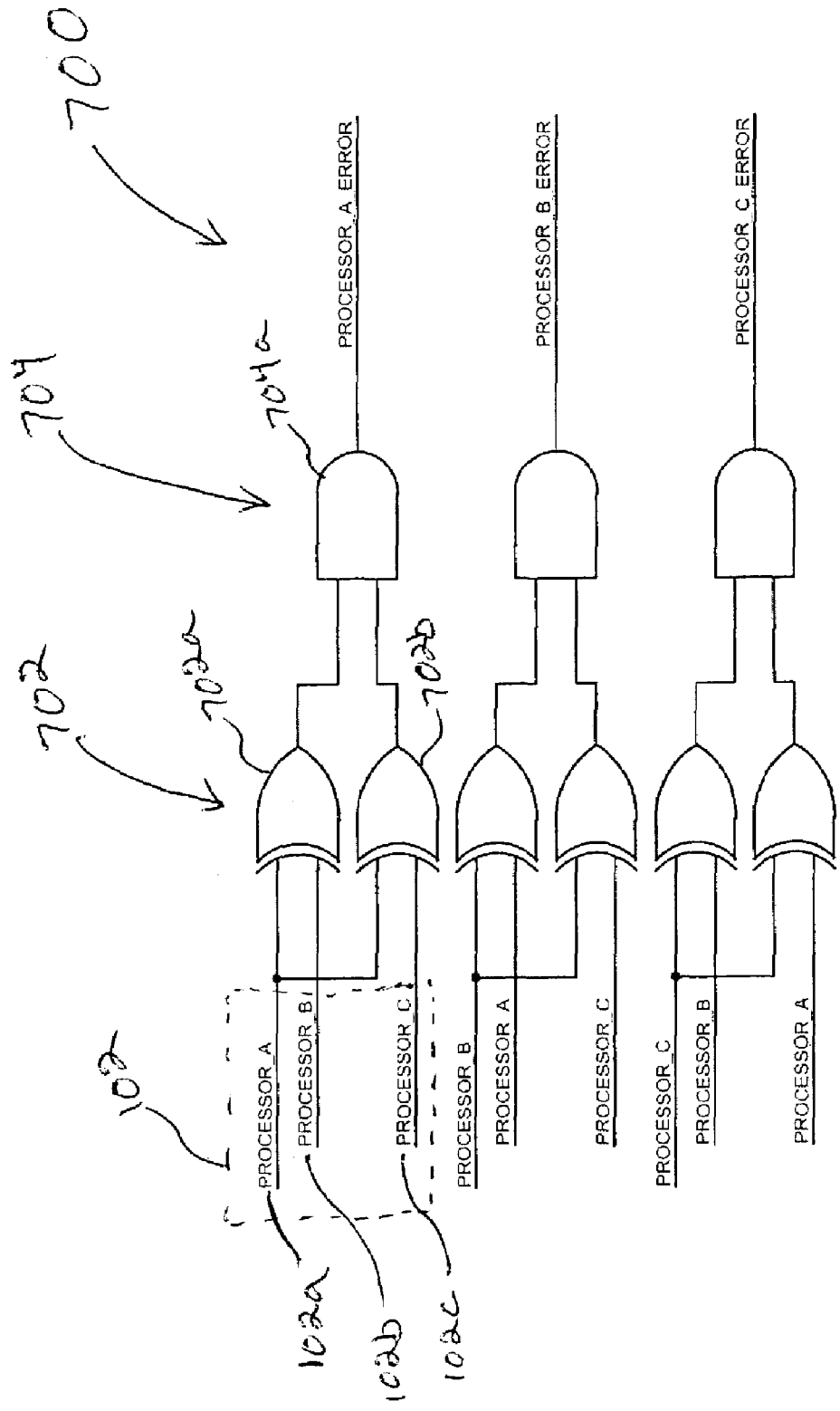
FIG. 7 is a schematic illustration of an arrangement for the identification of a faulty processor.

FIG. 7 illustrates an arrangement for identifying a processor which may be generating a minority signal. In this regard, an error is detected when there is any disagreement between any two processors 102a-c in the processor module 102. When such an error is detected, the controller 104 distinguishes between a correct signal and an erroneous signal by generating a majority output signal. The correct signal is defined as one which is received from a majority of the processors, while the incorrect signal is defined as one which is received from processors not in the majority. The arrangement 700 includes an array of XOR gates 702, each gate receiving inputs from two processors. A set of XOR gates 702a, 702b of the array 702 corresponds to a particular processor 102a. Each gate 702a, 702b in the set receives one input from the particular processor 102a and a second input from a different one of the processors 102b, 102c. Thus, each XOR gate detects whether the signal from the particular processor differs from any other processor. The output of each XOR gate 702a, 702b in the set is inputted to an AND gate 704a of an array 704 of AND gates. Thus, if the signal from the particular processor 102a differs from a majority of the remaining processors, the AND gate 704a outputs an error signal for the particular processor. This arrangement is repeated for each processor 102a-c of the processor module 102. The output error signals may be considered valid when the processors are expected to output valid data, and may be masked when the processors are not expected to output valid data.

The controller 104 thus identifies the processors transmitting the erroneous signal, and suspends operation of that processor. Suspending operation of the processor may be accomplished by holding the processor in reset mode. Further, the suspended processor may be isolated to prevent resource contention with operating processors or other devices. The controller 104 then logs the error in a system memory 106. The log contains an indication of the timing of the erroneous signal, as may be indicated by a time, a clock cycle number, etc. Additionally, the log may contain an identification of the faulty processor. The computer system 100 may then continue operating with one less processor. If the number of remaining processors can still identify a majority signal from a faulty signal, the controller 104 continues to use the voting logic 201 to detect errors and to identify the faulty processors. Otherwise, as may be the case with the three-processor module 102, with two processors running, the voting logic 201 may be able to detect an error (through disagreement between the two processors) but may be unable to identify which of the two signals is erroneous. In the event that a valid majority signal cannot be determined, as may be the case with two processors generating conflicting signal values, the controller 104 may, for example, halt operation of the processor module 102 to prevent erroneous output signals.

As noted above, the controller 104 applies the voting logic 201 to each signal received from the processors 102a-c. Thus, the processors 102a-c may complete millions of clock cycles each second. When an error is detected during any of these clock cycles, operation of the faulty processor is suspended. Correction of the errors, however, is not initiated upon detection of the error. Rather, a scrubbing of the processors 102a-c may be scheduled to occur at regular intervals or the reaching of a predetermined milestone, independently of whether or not an error is detected. Thus, a processor may be held in reset until the next scheduled scrubbing.

The milestone for the initiation of scrubbing of the processors 102a-c may be determined according to a desired level of reliability of the system 100. The reliability is a function of the scrubbing frequency and the expected frequency of errors. For example, for a spacecraft in geostationary orbit (GSO), an upset event is expected approximately once every one to ten days. At this expected error rate, a scrubbing frequency of one per second can provide a reliable processor module with an expected life of approximately 12,000 years for a three-processor module. In other words, the frequency of two separate processors in a three-processor module being struck by a single-event effect within a single second is once every 12,000 years.

Scrubbing and Resynchronization

Figure 3:
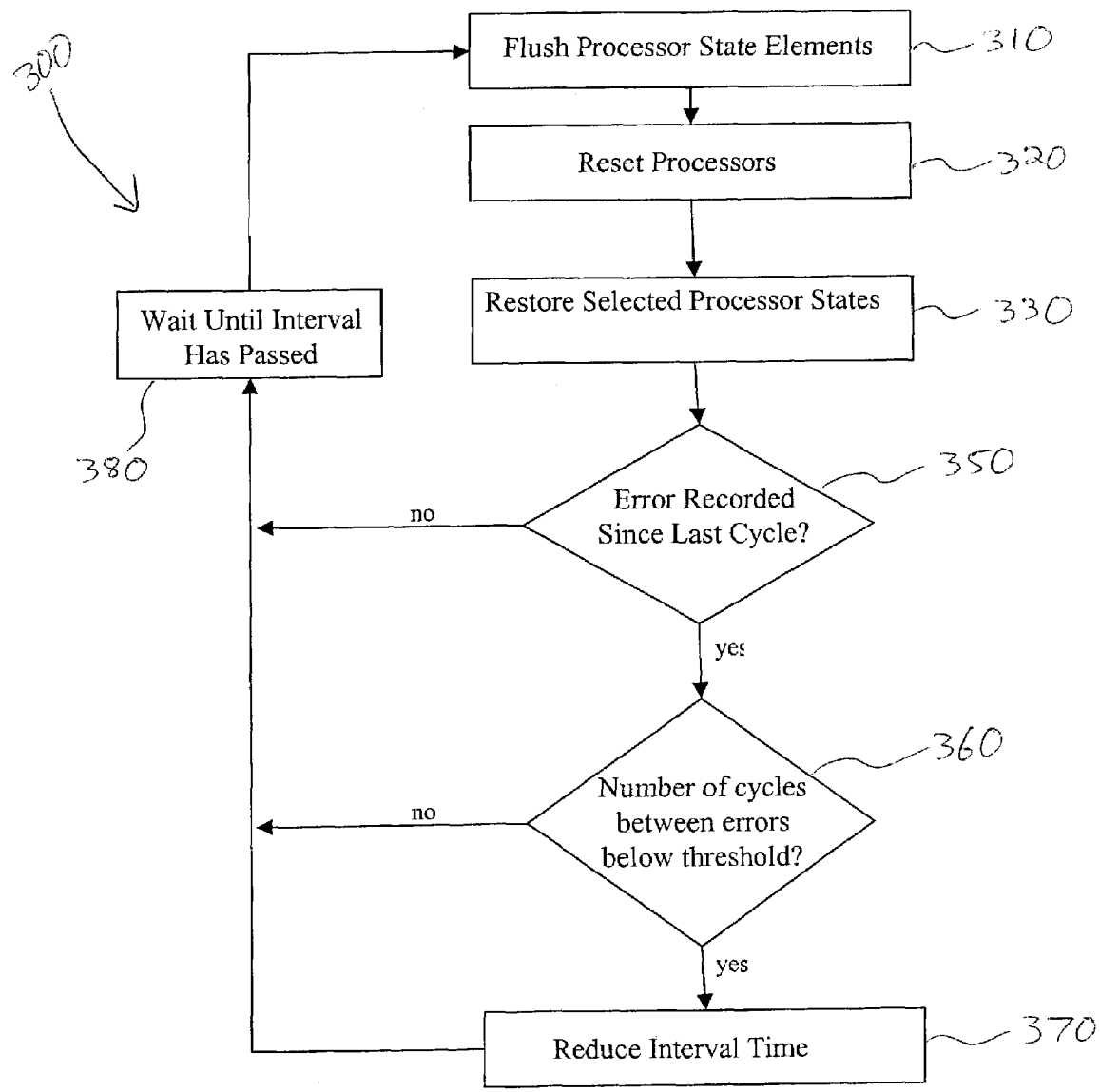
FIG. 3 is a flow chart illustrating the scrubbing of the processors according to an embodiment of the present invention.

FIG. 3 illustrates the process 300 by which the controller 104 or a scrubbing module within the controller 104 performs the scrubbing of the processors 102a-c. Upon the reaching of the predetermined milestone, the processor state elements 103a-c, such as the registers or cache, of each processor 102a-c is flushed (block 310). The flushed data from each processor is stored in the SDRAM 107 of the memory module 106. In one preferred embodiment, the SDRAM 107 includes an error correction logic, such as Reed-Solomon correction to provide separate protection for the system memory.

The data stored in the memory module 106 is used as the restoration data that will be used to restore the processor state elements 103a-c for resynchronization. In one embodiment, the restoration data may be developed during the flushing by performing a bit-by-bit or word-by-word comparison of the data from all processor state elements 103a-c. For example, the words or values in a particular state element in each processor may be examined for disagreement. The word or value corresponding to the state element of a majority of the processors is used in the restoration data. Thus, even if the particular state element would not have been immediately accessed by the processors, thereby preventing detection of an error, the scrubbing process can correct the undetected error.

The flushing of the processor state elements 103a-c, as well as the ensuing scrubbing, may be performed on only a portion of the processor state elements. For example, the processor state elements may be separated into ten segments. Each time the scrubbing module initiates the scrubbing process 300, only one segment is flushed and scrubbed. In this regard, all state elements 103a-c may be scrubbed after ten scrubbing cycles.

Figure 8:
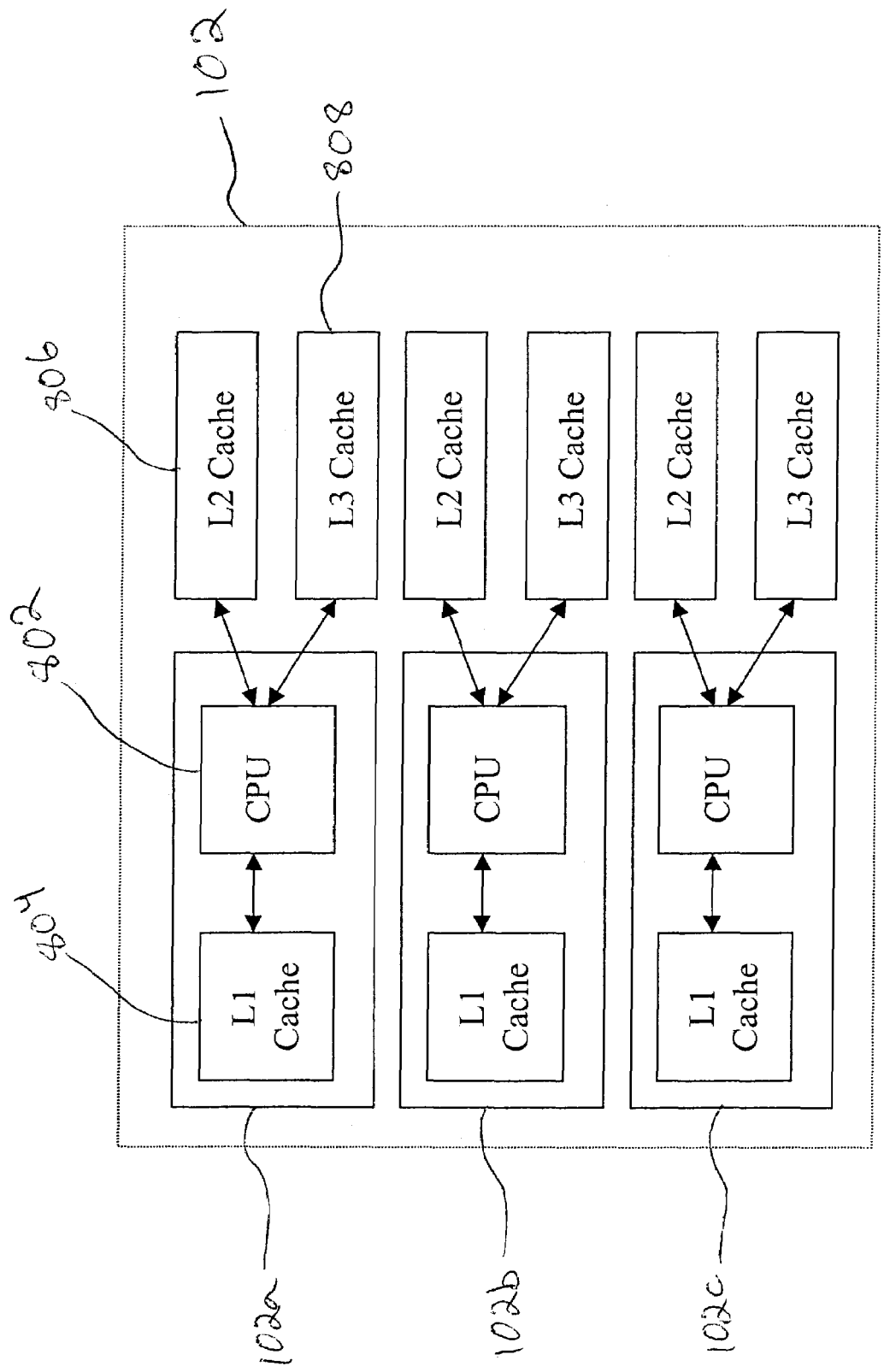
FIG. 8 is a functional block diagram of one embodiment of a processor module according to the present invention.

Many processors are provided with multiple cache memories, designated in a hierarchy of levels such as L1, L2 and L3. FIG. 8 illustrates one such arrangement. As indicated in FIG. 8, one or more caches 804 may reside within a processor 102a-c, while other caches 806, 808 may reside externally to the processor. A cache is typically used to store the most recently used data and instructions for faster access. Thus, L1 cache 804 may contain the most recent data, L2 cache 806 the next most recent, etc. In this arrangement, a CPU 802 may first attempt to access L1 cache 804 for a particular data value, then L2 cache 806, and then L3 cache 808. Some caches may be very large and may require a substantial amount of time to flush to the main memory during a scrub cycle. To reduce this time, a cache 804, 806, 808 may be configured as a write-through cache. Since L1 caches are usually relatively small, one configuration could be to have the L1 cache in write-back mode and the L2/L3 caches in write-through mode, where the data is stored in the L2/L3 caches and also sent out to main memory. Thus, the flushing of the write-through cache (in this example, L2/L3) during the scrubbing cycle is bypassed and not required to update the main memory. It is also possible to have other configurations of write-through and write-back, such as having all the caches in write-through mode, but this can have additional performance tradeoffs.

Once the processor state elements have been flushed, in one embodiment, the processors 102a-c are reset (block 320). In this regard, the processor state elements, such as the registers, are either emptied or set to a predetermined value such as zero. Further, the caches may be emptied during a reset. In another embodiment, the processors 102a-c are not reset after the flushing. Rather, as described below, the values of the selected processor state elements are simply replaced by restoration data. Some processor state elements can only be accessed indirectly, and therefore are re-created indirectly to obtain similar processor state elements for resynchronization.

At block 330, the restoration data is restored to each processor 102a-c in the processor module 102. The restoration of processor states resynchronizes the processors. Then the processors continue to operate in lock step through the transmission of the synchronous signals to the processors from the controller. The system 100 then continues to operate with all processors 102a-c functioning until either an error is detected or the next scrub cycle begins.

In one embodiment, the detection of errors is used to automatically maintain a level of reliability for the system 100. In this regard, during the scrubbing of the processor module 102, the scrub module of the controller determines whether an error was recorded during the previous scrub interval (block 350). This is accomplished by accessing the log data for recorded errors. If no errors were recorded in the previous scrub interval, the scrub module proceeds to block 380 and waits until the scrub interval is completed. On the other hand, if an error has been recorded in the previous scrub interval, the scrub module determines the number of scrub intervals between the last two errors. The number of intervals is compared against a threshold (block 360).

The threshold may be determined as either a function of present interval length or a desired reliability. In the above example, for the desired reliability, a scrub interval of one second was selected assuming one error every 1 to 10 days. In this example, a threshold of twenty-four hours may be set.

If the number of cycles is greater than the threshold, the scrub module proceeds to block 380 and waits for the length of the scrub interval to pass. On the other hand, if the scrub module determines that, for example, the number of intervals between the previous two errors corresponds to only a twelve-hour period, it determines that the number of cycles is less than the threshold and calculates a new scrub interval (block 370). The calculation of the scrub interval may be performed to maintain the desired reliability assuming a new error rate based on the number of cycles between the two previous recorded errors. In this manner, the desired reliability of the processor module 102 and the system 100 is maintained.

Figure 4:
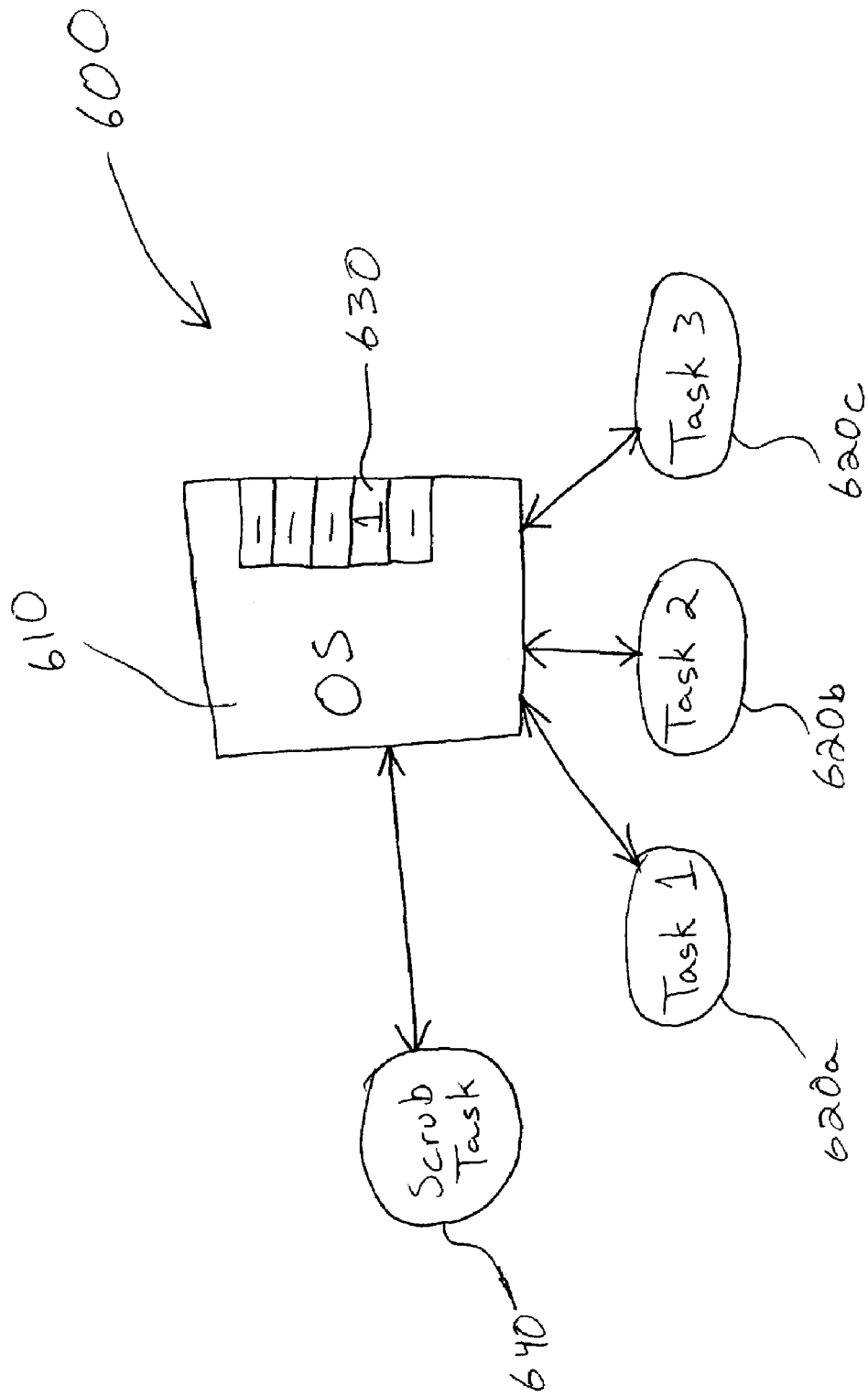
FIG. 4 is illustrates one software implementation for the initiation of the scrubbing.

Generally, prior fault-tolerant systems generate an interrupt signal when an error is detected. The interrupt signal instructs the operating system to stop all tasks and perform the error correction. A preferable scrubbing sequence should not interrupt other tasks being performed by the processors and the controller. In this regard, the scrubbing sequence should be initiated at a predetermined location in the operation of the operating system or software such that the operating system can resume operation at the precise location. FIG. 4 illustrates one embodiment of a software implementation for the initiation of the scrubbing cycle.

Operating systems, such as operating system 610 of the arrangement 600, are generally designed to perform a multitude of tasks at once. Typically, an operating system will cycle through these tasks by allocating a block of time or clock cycles to each task. For example, the operating system 610 may allocate 16 milliseconds to each of the tasks 620a-c. Thus, the operating system 610 may spend 16 milliseconds on Task 1 620a, then 16 milliseconds on Task 2 620b, and so forth. In the disclosed embodiment, a single bit 630 is provided for the operating system to check either between each task or after a particular task. Thus, for example, each time the operating system allocates a time block to Task 3 620c, it may check the value of the bit 630. The bit 630 may be adapted to be set to "1" when the milestone, such as a time interval, for the initiation of the scrubbing cycle has been reached. Otherwise, the bit 630 is set to "0". In this regard, rather than sending an interrupt, the controller or the scrub module may simply send a signal to change the value of the bit.

If the operating system 610 detects the value of the bit 630 to be "1", the operating system 610 may allocate one or more blocks of time to the scrub task 640. When the scrub task 640 is completed, the operating system 610 may continue with the allocation of time blocks to the various tasks 620a-c. In this manner, no tasks are interrupted by the scrubbing module and performance of the system 100 is improved with minimal intrusion to real-time software. Also, user defined controls can be used to inhibit scrubbing and resynchronization until ideal times where real-time software intrusion can be avoided.

Fault-Tolerant Memory Module

In addition to providing fault tolerance for the processors, the computer system may also include fault-tolerant memory components. In one preferred embodiment, the memory module 106 is provided with an error detection and correction logic. In a further preferred embodiment, the error detection and correction logic includes a Reed-Solomon algorithm. One preferred implementation of such an error detection and correction logic is disclosed in U.S. Pat. No. 5,754,563, entitled "Byte-Parallel System for Implementing Reed-Solomon Error-Correcting Codes," which is incorporated herein by reference in its entirety.

Figure 5:
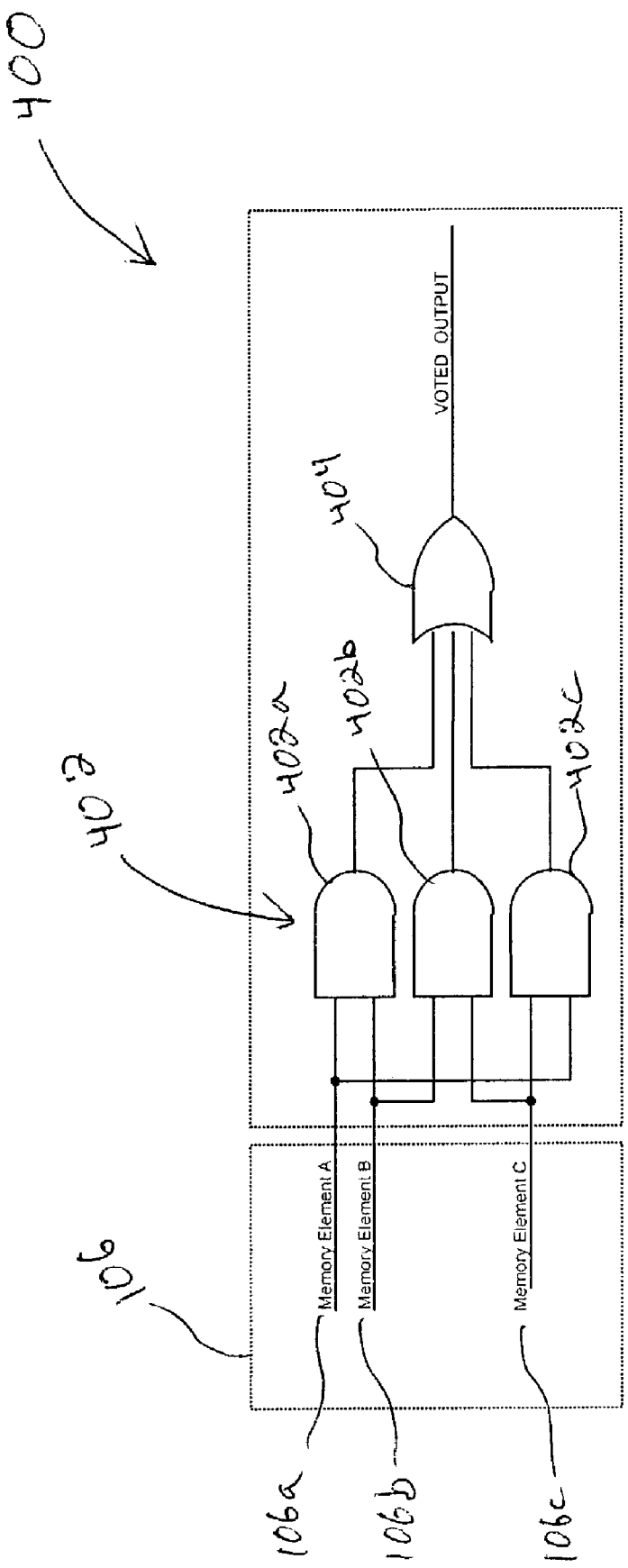
FIG. 5 is a schematic illustration of an arrangement to provide tolerance to faults in a memory module.

In another embodiment, a fault-tolerant memory module employs a form of modular redundancy similar to that described above with reference to FIG. 2 for processors. One such embodiment is illustrated in FIG. 5. The memory module 106 is provided with three or more memory elements 106a-c. The memory elements 106a-c are mirrored and may be any part or all of the memory module 106 including SDRAM 107 and EEPROM 109. The mirrored memory elements 106a-c follow identical instructions and perform identical steps. Thus, in the absence of errors, each memory element 106a-c is identical to the others.

An array of AND gates 402 is provided to receive inputs from the memory elements 106a-c. The inputs may be the value of the entry at a particular address, for example. Each AND gate 402a-c in the array 402 receives two inputs, one each from two different memory elements 106a-c. The output from each AND gate 402a-c is directed to an OR gate 404. The output of the OR gate 404 is indicative of the majority vote of the inputs from the memory elements. The controller 104 may immediately replace the entry at the particular address of the faulty memory element with the correct value. The memory module 106 may then resume normal operation.

The above-described error detection and correction of the memory module 106 may be performed each time the controller 104 reads from or writes to the memory elements 106a-c. In this manner, only the addresses accessed for the read or write are processed for error detection and correction.

In another embodiment, a regularly-scheduled scrubbing of the memory module 106 may also be performed. In this embodiment, at regular predetermined intervals, the error detection and correction logic may be applied to all addresses of each memory element 106a-c. Thus, the entire memory module 106 can be scrubbed free of errors.

Radiation Shielding

In addition to the above-described hardware, software or firmware protections, various components of a computer system 100 may also be provided with a mechanical shield for protection from radiation particles. For examples of such shielding, reference may be made to U.S. Pat. Nos. 5,635,754, 5,825,042, 5,889,316, and 6,262,362, each of which is incorporated herein by reference in its entirety.

Figure 6B:
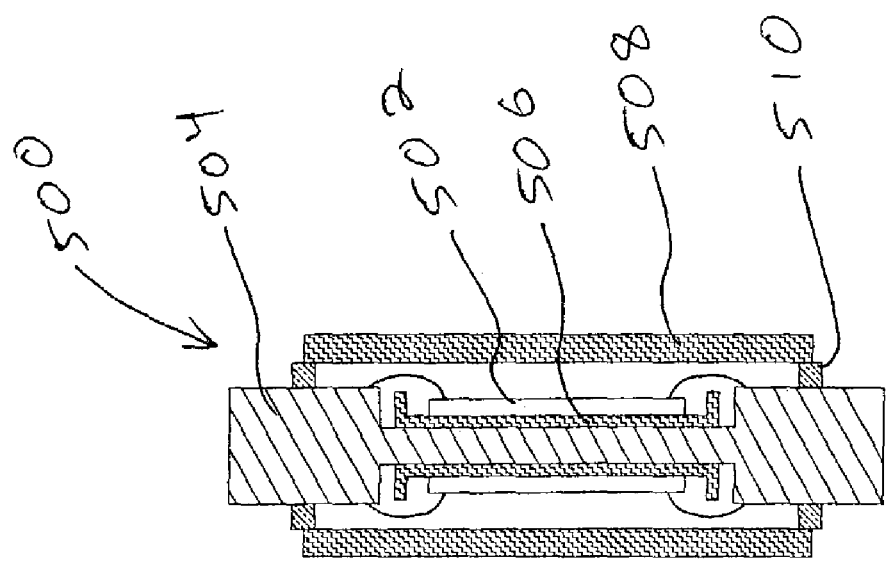
FIGS. 6A and 6B illustrate a fault-tolerant computer component with radiation shielding.
Figure 6A:
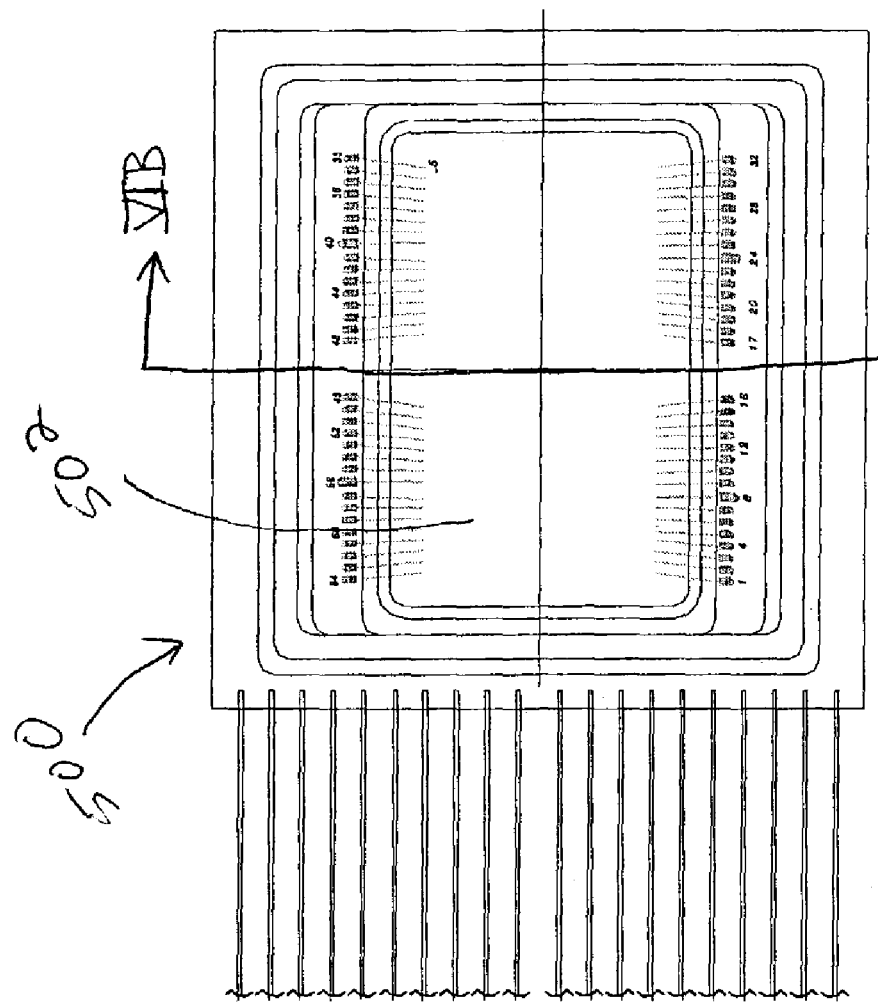

FIGS. 6A and 6B illustrate one example of a radiation shield for protection of computer components. In the illustrated example, the protected module 500 includes a computer component 502, such as a processor or a memory, mounted on a substrate 504. Radiation shield 506 is mounted on the substrate 504 before the component 502 is mounted thereon to provide protection on the bottom of the component 502. Further, a second radiation shield 508 is mounted above a component cavity to provide protection from the top of the component 502. In a preferred embodiment, the shields 506, 508 are the Rad-Pak™ shields available from Maxwell Technologies, Inc. A radiation-mitigating spacer material 510 is positioned on the perimeter of the component cavity and engages the second radiation shield 508 to provide complete, line-of-sight radiation protection for the component 502.

In a preferred embodiment, each component is separately shielded as described above with reference to FIGS. 6A and 6B. In this manner, the weight of the shielding is minimized. In another embodiment, the entire computer system 100 is protected by radiation shielding. In this regard, the computer component 502 described above in FIGS. 6A and 6B may be replaced with a computer system on a single board, for example. The radiation shielding may then be appropriately sized to provide the desired protection.

While preferred embodiments and methods have been shown and described, it will be apparent to one of ordinary skill in the art that numerous alterations may be made without departing from the spirit or scope of the invention. Therefore, the invention is not limited except in accordance with the following claims.

We claim:

1. A self-correcting computer system comprising
three or more processors running in lock-step;
a controller adapted to receive signals from the processors and being further adapted to determine a majority value for the received signals and detect errors within the received signals; and
a scrubbing module adapted to recurrently resynchronize the processors at a predetermined milestone by reconfiguring elements of the processors to a prior state, the resynchronization being in accordance with the majority value, wherein
the controller is adapted to record an error when a signal from one or more processors disagrees with the majority value; and
the controller is adapted to change the predetermined milestone.

2. The computer system according to claim 1, wherein the controller is adapted to change the predetermined milestone based on a frequency of recorded errors.

3. The computer system according to claim 1, wherein the controller is adapted to change the predetermined milestone based on system requirements.

4. A self-correcting computer system comprising
three or more processors running in lock-step;
a controller adapted to receive signals from the processors and being further adapted to determine a majority value for the received signals and detect errors within the received signals;
a scrubbing module adapted to recurrently resynchronize the processors at a predetermined milestone by reconfiguring elements of the processors to a prior state, the resynchronization being in accordance with the majority value; and
a memory module adapted to store data, said memory module being in communication with said processors;
wherein the memory module further comprises
three or more mirrored memory elements; and
a memory scrub module adapted to detect an error in one or more of said memory elements when an entry at a selected address of said one or more memory elements differs from an entry at said selected address of a majority of said memory elements, and
wherein said memory scrub module is further adapted to reconfigure said one or more memory elements in which an error is detected to contain an entry at the selected address identical to said entry at the selected address of said majority of said memory elements.

5. A self-correcting computer system comprising
three or more processors running in lock-step;
a controller adapted to receive signals from the processors and being further adapted to determine a majority value for the received signals and detect errors within the received signals;
a scrubbing module adapted to recurrently resynchronize the processors at a predetermined milestone by reconfiguring elements of the processors to a prior state, the resynchronization being in accordance with the majority value; and
a memory module adapted to store data, said memory module being in communication with said processors;
wherein the memory module further comprises
three or more mirrored memory elements; and
a memory scrub module adapted to detect an error in one or more of said memory elements when an entry at a selected address of said one or more memory elements differs from an entry at said selected address of a majority of said memory elements, and
wherein said memory scrub module is adapted to test for errors at regular intervals and to reconfigure an entry at an address of one or more of said memory elements when said entry differs from an entry at said address of a majority of said memory elements.

6. A fault-tolerant computer system comprising
three or more mirrored memory elements; and
a memory scrub module adapted to detect an error in one or more of said memory elements when an entry at a selected address of said one or more memory elements differs from an entry at said selected address of a majority of said memory elements wherein said memory scrub module is adapted to test for errors at regular predetermined intervals,
wherein said memory scrub module is further adapted to reconfigure said one or more memory elements in which an error is detected to contain an entry at the selected address identical to said entry at the selected address of said majority of said memory elements.

7. A fault-tolerant computer system comprising
three or more mirrored memory elements; and
a memory scrub module adapted to detect an error in one or more of said memory elements when an entry at a selected address of said one or more memory elements differs from an entry at said selected address of a majority of said memory elements wherein said memory scrub module is adapted to test for errors at regular predetermined intervals,
wherein said memory scrub module comprises
an array of AND gates, each gate in said array having as a first input a signal from one of said memory elements, and as a second input a signal from a different one of said memory elements, each gate in said array yielding a first output; and
an OR gate having as inputs the first output from each gate in said array of AND gates, said OR gate having a second output; and
wherein said memory scrub module is adapted to detect an error based on said second output.

8. A method of self-correcting by a computer, the method comprising recurrently performing the following operations:
a) flushing selected processor state elements from three or more processors of said computer when a predetermined milestone is reached;

b) storing restoration data on a system memory, said restoration data being indicative of majority value of each of said selected processor state elements; and c) restoring said selected processor state elements using said restoration data.

9. The method according to claim 8, wherein the three or more processors are reset prior to step c).

10. The method according to claim 8, wherein the predetermined milestone is a time interval.

11. The method according to claim 8, wherein the predetermined milestone is a number of clock cycles.

12. A self-correcting computer system comprising three or more processors running in lock-step;

a controller adapted to receive signals from the processors and being further adapted to determine a majority value for the received signals and detect errors within the received signals; and a scrubbing module adapted to recurrently resynchronize the processors at a predetermined milestone by reconfiguring elements of the processors to a prior state, the resynchronization being in accordance with the majority value, wherein the predetermined milestone is determined as a function of a reliability of the computer system; and the reliability is determined as a function of a scrubbing frequency and a frequency of an anticipated error.

13. The computer system of claim 12, wherein the anticipated error is a result of a single event effect.

* * * * *